3,283,383
SECURING DEVICE
Robert John Heath, Flintways, White Hill,
Marlow, England
Filed Apr. 19, 1965, Ser. No. 449,263
Claims priority, application Great Britain, Apr. 20, 1964,
16,218/64
7 Claims. (Cl. 24—245)

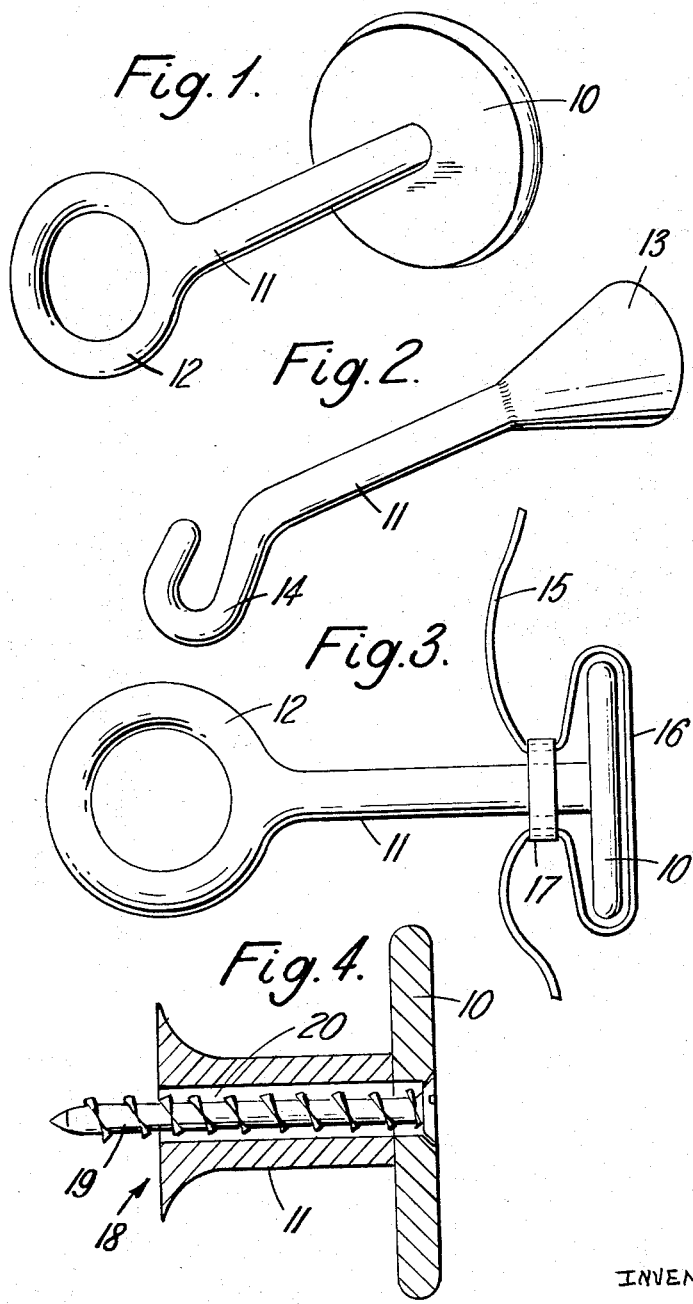

This invention relates to the securing of resilient sheeting.

Flexible or resilient sheeting is often used to provide a protective cover for irregularly shaped objects such as small boats, vehicles, hay ricks, vehicle loads and the like. It is often desirable to secure the sheeting in place either to the article itself or to cleats or hooks fixed at suitably spaced locations around it. For this purpose, it has hitherto, often been the practice to provide the sheeting with a number of eyelets through which ropes or cords may be passed, the ropes or cords being secured to the article or the cleats thereon in the known manner. Such arrangements have the disadvantage that, even when strengthened by metal eyelets, the sheeting adjacent a perforation tends to crack or tear if the rope passing through the perforation exerts great tension on the sheeting due to the weakening effect on the sheeting or perforating it. For this reason, eyelets cannot be used in thin plastic sheeting, for example polyethylene sheeting. Furthermore, if a piece of sheeting is to be used on a number of occasions for protecting articles which are substantially different in shape or size, it may not be desirable to have a fixed set of perforations in the sheeting. The present invention avoids the above disadvantages by providing a means for securing sheeting without requiring the sheeting to be perforated.

According to this invention, a securing device for securing flexible or resilient sheeting comprises a member consisting of a shank having at one end a knob with a section, in a plane transverse to the axis of the shaft, of an area at least twice and preferably at least five times the cross-sectional area of the shank, all the external surfaces of the knob being smooth without sharp edges, in combination with a resilient band to be put over said shank when the sheeting is in position to retain on the member a mouth formed in the sheeting, the dimensions and elasticity of the band being such that when the sheet is pulled, the band allows the said mouth to expand without the sheet tearing. The member may be secured in this manner to the sheeting in any desired location, and in general several such members may be employed for holding a sheet.

The other end of the shank may have means for securing it to a rope or cord; for example, it may be formed as a hook, loop or ring, and the member may conveniently be moulded in one piece of plastic material for example, polyethylene or polyvinyl chloride.

The members, when secured to the sheeting as described above, may then be secured by ropes or cords to fixed cleats or to any other suitable points on or around the article itself. It will be appreciated that there are in general many ways of selecting the particular number and locations of the points of attachment, the particular method selected depending on the size and shape of the covered article.

Alternatively, the aforementioned member may be fixed at a particular location on, for example, a vehicle whose load is to be covered, by a screw located in the shank whose end may be flared to form a supporting base of large diameter.

The knob may be any shape convenient for the sheeting used. Preferably, however, the knob is a thick disc having a diameter substantially greater than that of the shank, one end of the shank being centrally located on one of the flat sides of the disc. The disc may be circular and the surfaces which may come into contact with the sheeting may be made smooth to prevent abrasion or tearng of the sheeting. It may, however, be more convenient for the knob to be generally conical in shape, the apex of the cone being either attached to or integral with the shank.

The dimensions and elasticity of the resilient band would normally be chosen in accordance with the thickness and resilience of the sheeting used. A sufficient set of requirements for the selection of the band is that it should be possible to stretch the band so that it will pass over the pocket of sheeting formed on the knob, but that the band should not allow the mouth to expand sufficiently to enable it to pass over the knob when a force is applied to the sheeting or the shank, while allowing it to expand sufficiently to prevent abrasion or tearing.

In the following description, reference will be made to the accompanying drawing in which:

FIGURE 1 is a perspective view of a securing member;
FIGURE 2 is a perspective view of another form of securing member; and
FIGURE 3 is a sectional view illustrating the member of FIGURE 1 attached to a portion of resilient sheeting and FIGURE 4 shows in section a further embodiment of a securing member.

Referring firstly to FIGURE 1, the securing member comprises a thick circular disc portion 10 with a shank portion 11 extending in a direction normal to the centre of one side of the disc portion, the other end of the shank portion 11 being attached to the periphery of a ring or torus member 12 arranged in the same plane as the axis of the shank and having a circular cross-section, the thickness of the ring being substantially the same order as the shank. In one example, the disc may have a diameter of about one and a half inches, the shank diameter being approximately half an inch. These measurements are merely by way of example and can be varied considerably, in particular according to the strength and thickness of the sheeting. The securing member as illustrated in FIGURE 1 is formed integrally from a plastics material; it would also be possible to make the ring portion detachable from the shank, and for this purpose, the shank may have at its end a collar portion at the end of which an inwardly directed circumferential flange is provided, which flange would be arranged to engage a circumferential groove on a short shank portion attached to the circumference of the torus portion 12. Since the member is made of a plastics material, the two portions would be easily joined together to form a secured joint.

In FIGURE 2 is shown an alternative embodiment of the securing member having a shank portion 11 as before but with a conical portion 13 in place of the disc 10. Also, in place of the torus portion 12 there is a hook 14 which could engage an eye on an end of a securing rope.

In FIGURE 3 is shown a sectional view of the securing member of FIGURE 1 arranged in the secured position to a portion of the resilient sheeting. The sheeting 15 has formed in it a pocket 16 fitting over the disc portion 10 and forming a mouth which is secured around the shank by the resilient band 17. As has been explained before, the dimensions of the band would depend upon the nature of the sheeting which is to be secured to the member 10.

The member is secured to the sheeting in the following manner; a small area of the sheeting is selected and the front surface of the disc placed against it. The sheeting around the portion thus in contact is folded about the periphery of the disc to form a mouth surrounding the disc and its lips are formed around the shank a small distance from the disc. The resilient band is passed over the pocket and allowed to relax over the mouth's lips. The sheeting surrounding the connection thus made will of course extend over the article as desired.

A rope may be passed through the ring to secure the member in the location necessary for the proper positioning of the sheeting over the article.

It will be apparent that the formation of a pocket as described above will cause the sheeting to be pleated and folded in the vicinity of the pocket. The pleats and folds will, however, lessen the danger of tearing the sheeting since any stress imposed on the mouth of the pocket will be borne by several layers of sheeting.

The securing member shown in FIGURE 4 is similar to that shown in FIGURES 1 and 3, except that the end of the shank 11 remote from the disc 10 is outwardly flared so that the flat end 18 may form a supporting base, which may be secured to a rigid support, the countersunk screw 19 passing through the centre of the disc 10, and through the axial bore 20 in the shank end axially away from the end 18 to engage a suitable support, which may be timber or brickwork in suitable locations on vehicles, boats or grounded fixtures, the screw securing the disc 10 to the shank 11. It will be apparent that the screw may be dispensed with in some variations, it being possible to replace it with a lug or lugs, extending away from the base 18, which may be secured to the support in a suitable manner. Alternatively, the base 18 may be adhesively attached to the support provided that the resultant fixture is strong enough to support the sheeting.

The sheeting may be secured to the securing members of FIGURE 2 and FIGURE 4 in the same manner as it is secured to the member of FIGURE 1, as depicted in FIGURE 3.

I claim:

1. Securing device for securing resilient sheeting comprising a member having a smooth surfaced circular disc, and a shank, one end of said shank being located centrally on one of the flat sides of said disc, said disc having a cross-sectional area at least five times that of the shank, in combination with a resilient band, said resilient band being disposed over said shank when the sheeting is in position to retain on said disc a mouth formed in the sheeting, the dimensions and elasticity of the band being such that when the sheet is pulled the band allows the mouth to expand without the sheet tearing or the said mouth passing over the disc.

2. Securing device for securing resilient sheeting comprising a smooth surfaced member having a shank portion of circular cross-section, a torus portion at one end of said shank, said torus portion being located in the plane of the shank's axis, and having a maximum diameter at least twice that of the shank, a disc portion integrally attached to the other end of said shank portion at the centre of one of the sides of said disc, said disc having a cross-sectional area, in plane transverse to the axis of the shank, at least five times that of the shank, in combination with a resilient band having an unextended diameter intermediate those of the shank portion and disc portion, said sheeting, when in position, having a mouth formed in it, the mouth being disposed over said disc portion, said resilient band being located over the lips of said mouth to retain the mouth on the member.

3. Securing device for securing a sheet of resilient sheeting comprising in combination
    (a) a smooth surfaced member having an axially bored shank portion, one end of said shank portion being outwardly flared to have a cross-sectional area at least twice that of the other end of the shank, a parallel sided centrally bored smooth surfaced disc portion having a cross-sectional area, in a plane transverse to the axis of the shank, at least five times said other end of the shank, a securing screw disposed within said axially bored shank portion and said disc portion, the head of said screw retaining said disc portion on said shank; and
    (b) a resilient band having an unextended diameter intermediate those of said other end of the shank and said disc portion; said sheeting, when in position, having a mouth formed in it and disposed over said disc, said resilient band being located over the lips of said mouth over said shank portion to retain the mouth over said member.

4. Securing device for securing resilient or flexible sheeting comprising a member consisting of a shank and a knob at one end of said shank, said knob having a cross-section, in a plane transverse to the axis of the shank, of an area at least five times the cross-sectional area of the shank, all the external surfaces of the knob being smooth without sharp edges, in combination with a resilient band, said resilient band being disposed over said shank when the sheeting is in position to retain on the member a mouth formed in the sheeting, the dimensions and elasticity of the band being such that the band may be stretched to pass over the mouth of a pocket of sheeting formed on the knob and such that the band prevents the mouth of the pocket from expanding to pass over the knob when a force is applied to the sheeting or the shank.

5. Securing device as claimed in claim 4 wherein the other end of the shank is formed as a ring.

6. Securing device as claimed in claim 4 wherein the other end of the shank is formed as a hook.

7. Securing device as claimed in claim 4 wherein said knob comprises a smooth surfaced frusto conical portion whose narrower end is integral with said shank.

References Cited by the Examiner

UNITED STATES PATENTS

| | | | |
|---|---|---|---|
| 806,521 | 12/1905 | Childs | 24—246 |
| 850,346 | 4/1907 | Conover | 24—246 |
| 1,103,723 | 7/1914 | Witte | 135—15 |
| 1,399,730 | 12/1921 | Abe | 24—245 |

WILLIAM FELDMAN, *Primary Examiner.*

D. GRIFFIN, *Assistant Examiner.*